A. HOSSFELD.
MANURE LOADER.
APPLICATION FILED OCT. 18, 1915.

1,190,550.

Patented July 11, 1916.
3 SHEETS—SHEET 1.

Witnesses

A. Hossfeld, Inventor
by C.A. Snow & Co., Attorneys

A. HOSSFELD.
MANURE LOADER.
APPLICATION FILED OCT. 18, 1915.

1,190,550.

Patented July 11, 1916.
3 SHEETS—SHEET 2.

Witnesses
J. Tomen
R. L. Parker

A. Hossfeld  Inventor
by Chnow & Co.
Attorneys

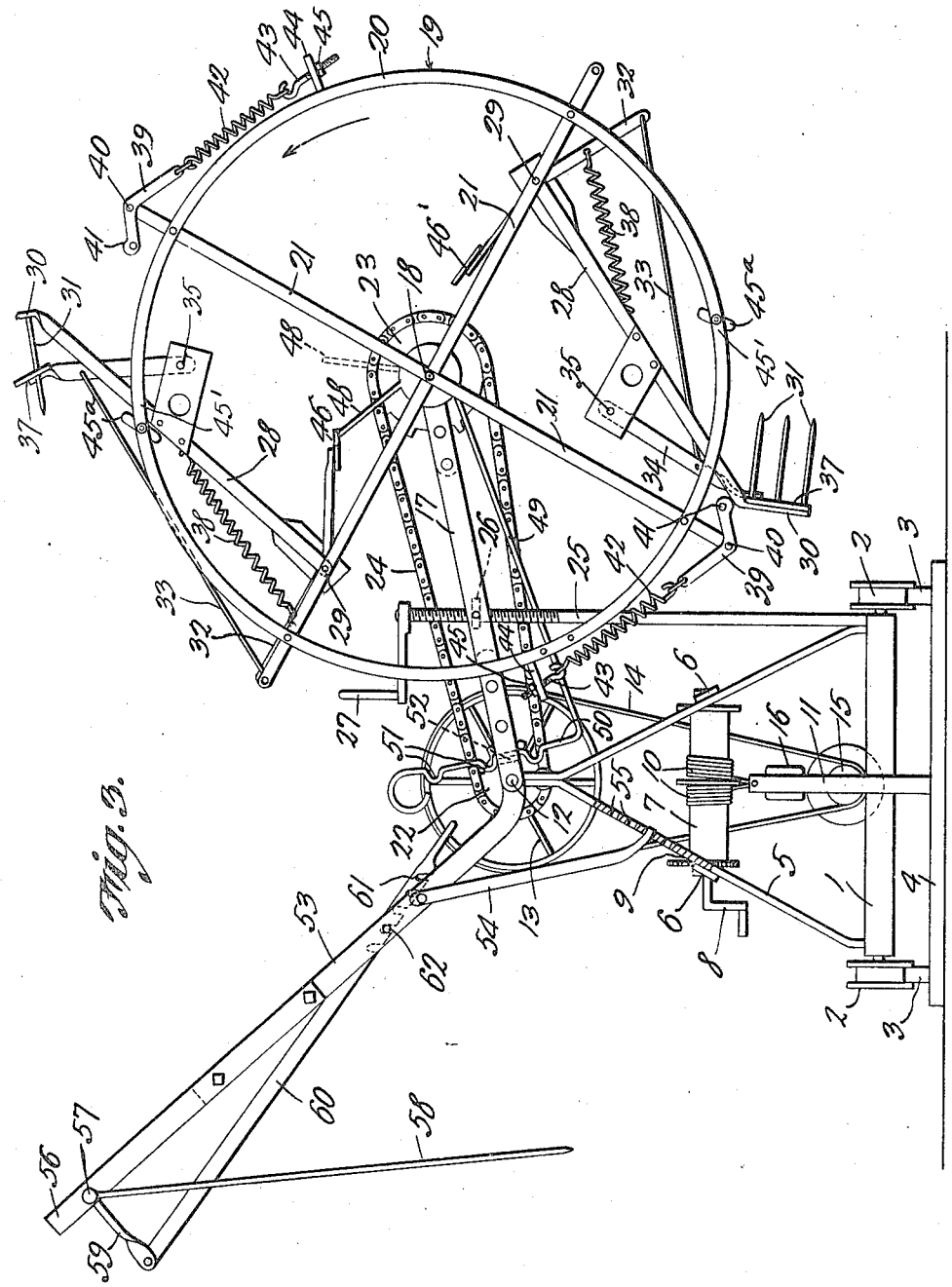

UNITED STATES PATENT OFFICE.

ALBERT HOSSFELD, OF LEWISTON, MINNESOTA.

MANURE-LOADER.

1,190,550. Specification of Letters Patent. Patented July 11, 1916.

Application filed October 18, 1915. Serial No. 56,502.

*To all whom it may concern:*

Be it known that I, ALBERT HOSSFELD, a citizen of the United States, residing at Lewiston, in the county of Winona and State of Minnesota, have invented a new and useful Manure-Loader, of which the following is a specification.

The present invention appertains to loading machines, and aims to provide a machine of that character adapted especially for loading manure onto a wagon or other receptacle.

The invention embodies a rotatable wheel having forks or buckets for lifting or tearing the manure from the mass or pile, the machine being constructed to utilize centrifugal force for pitching or throwing the manure from the forks or buckets so that it lands in the wagon or receptacle.

Another object of the invention is the provision of a manure loader having the characteristics above noted, and embodying means whereby the wheel can be raised or lowered and shifted longitudinally, so that the forks or buckets can be made to get at the entire pile or mass of manure.

A still further object of the invention is to provide novel means for mounting the buckets or forks upon the rotating wheel, and for controlling them properly, there being means for ejecting the manure from the forks or buckets and for clearing the prongs thereof.

The invention also includes novel means for catching the manure thrown upon the forks or buckets, and for directing it properly into the wagon or receptacle.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1:
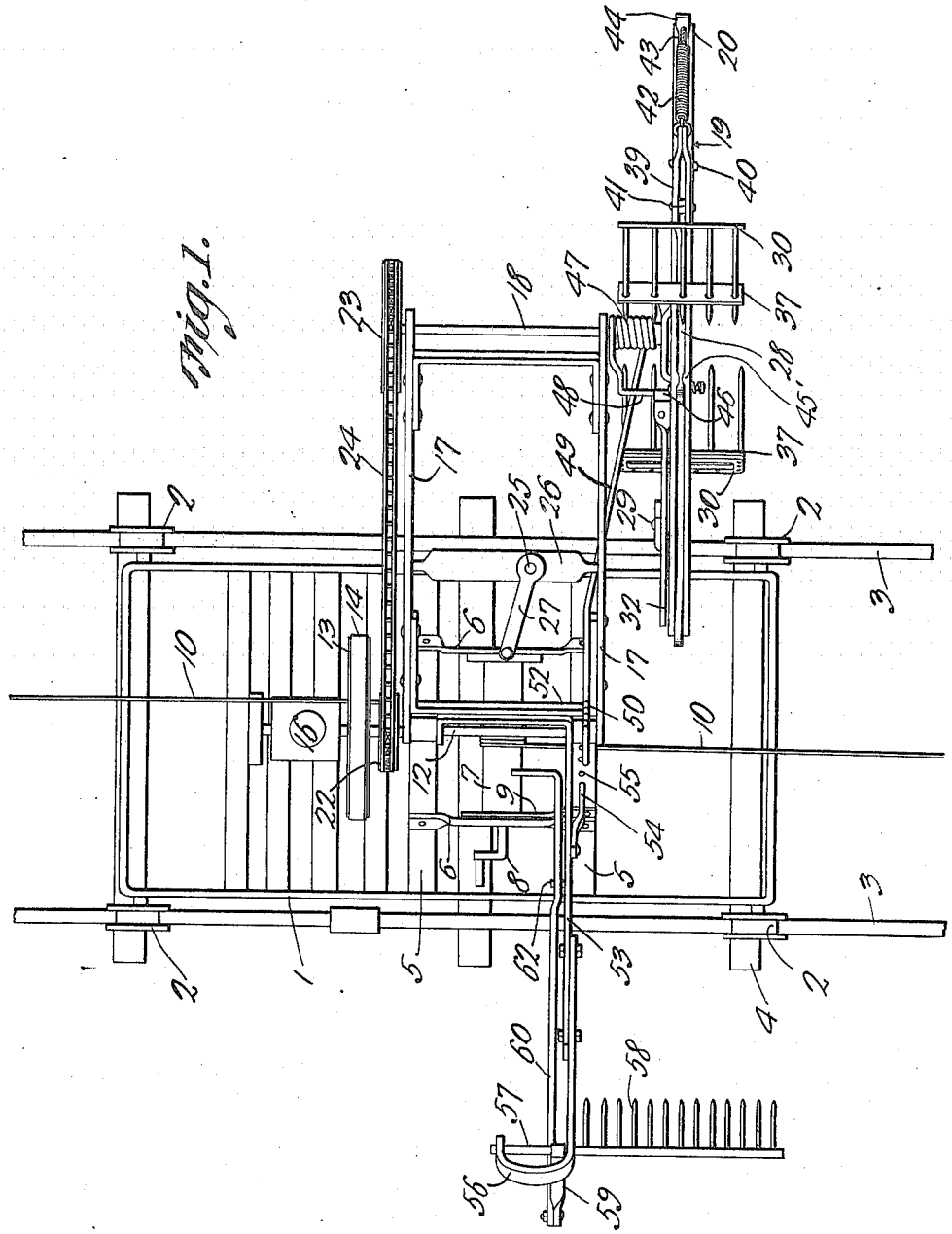
Figure 2:
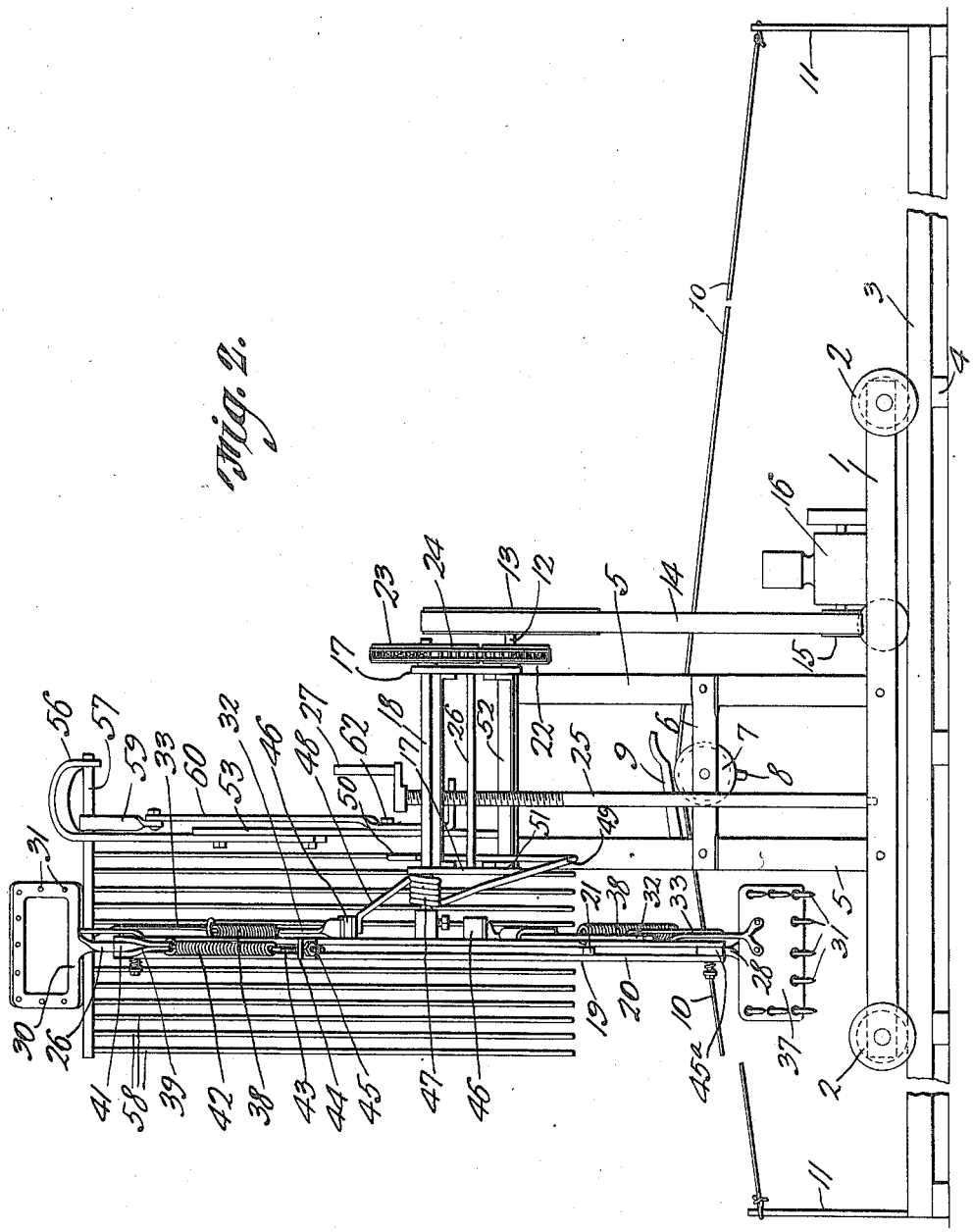

Figure 1 is a plan view of the apparatus. Fig. 2 is a side elevation thereof. Fig. 3 is another elevation, the line of view being at right angles to the line of view in Fig. 2.

In carrying out the invention, there is provided a truck or carriage embodying a frame 1 having supporting wheels 2, and this truck or carriage is movable longitudinally upon the rails 3 of a track 4 laid at one side of the pile or piles of manure, the wheels 2 running upon said rails for properly guiding the truck.

Carried by the frame 1 is a pair of upstanding inverted V-shaped standards 5 disposed transversely of the truck, and the limbs of the two standards are connected between their ends by cross pieces or bars 6. A drum or windlass 7 is mounted for rotation between the bars 6 and has its shaft journaled therethrough, one end of said shaft being provided with a hand crank 8 whereby the drum can be rotated conveniently. A dog 9 pivoted to one standard 5 is engageable with the drum 7 to prevent the rotation thereof ordinarily, said dog being readily released to allow the drum to be turned. A pair of cables or flexible elements 10 are attached to and wound upon the drum 7 in opposite directions, and the remote ends of the cables 10 are attached to standards 11 at the remote ends of the track 4. By rotating the drum 7, the cables 10 are wound upon and unwound from the drum 7, whereby the carriage or truck can be shifted longitudinally to the desired position. This provides simple and effective means for moving the truck, although other suitable means may be employed for this purpose. The track can be of any length required.

Journaled for rotation through the upper ends of the standards 5, is a horizontal shaft 12, a pulley wheel 13 being keyed upon one protruding end of the shaft 12, and being connected by a belt 14 with the pulley wheel 15 of an internal combustion engine or other prime mover 16 mounted upon the frame 1. This engine or prime mover serves to weight the frame 1 down, to prevent the tilting thereof, and the engine also serves to operate the machine.

Carried by the shaft 12 is an oscillatory frame projecting to one side, said frame embodying a pair of bars 17 pivotally embracing the shaft 12. A counter shaft 18 is journaled through the free ends of the bars 17, and has attached to one end thereof, a relatively large elevating wheel 19 embodying a rim 20 and spokes 21. This wheel 19 is rotated by means of the shaft 12, sprocket wheels 22 and 23 being keyed upon the shafts 12 and 18, respectively, and an endless sprocket chain 24 being trained around said sprocket wheels, whereby the shaft 18 is rotated when the shaft 12 is revolved.

The wheel 19 is raised and lowered by adjusting the bars or arms 17 vertically, and to this end, an upright screw 25 has its lower end swiveled upon the frame 1 in any suitable manner, and the screw 25 is threaded through a nut 26 trunnioned between the bars 17. The upper end of the screw 25 has a hand crank 27 whereby the screw may be rotated by hand for raising or lowering the bars 17 and wheel 19 carried thereby.

The forks or buckets are carried by the wheel 19, and to this end, arms or shanks 28 are pivoted, as at 29, to certain spokes 21, there being one arm 28 for each fork or bucket, and there may be any suitable number of forks or buckets. The arms 28 project in a chordal direction past the rim 20 of the wheel 19, and are provided at their free or outer ends with heads 30 having attached thereto, a number of prongs 31 providing the forks or buckets. The prongs 31 are detachable, in order that they may be readily replaced should they become bent or broken. The forks or buckets are of scoop-shape.

A lever 32 is fulcrumed between its ends to each pivotal element 29, and the outer end or arm of each lever 32 is connected by a cord, rod or link 33 with a lever 34 coöperating with the respective fork or bucket. Each lever 34, is pivoted as at 35, to a member 36 attached to the respective lever 28 within the wheel. The outer or free end of the lever 34 has an ejecting plate 37 apertured for the passage of the prongs 31 of the respective fork or bucket. The plate or ejector 37 surrounds each of the prongs, whereby when the said ejector is moved to eject the contents of the fork, any trash or accumulation clinging to the prongs will be cleared therefrom. A spring 38 connects the outer arm of each lever 32 with the respective member 36. The spring 38 normally pulls the lever 32 to proper position, and the link 33 being forced back by the lever 32 will move the ejector 37 against the head 30 of the fork.

Buffers are carried by the wheel 19 against which the forks or buckets are adapted to bear, and to this end angular or L-shaped levers 39 have their elbows pivoted, as at 40, to the projecting outer ends of those spokes 21 between those spokes to which the arms 29 are pivoted. One arm of each lever 39 provides a buffer 41 against which the respective head 30 is adapted to rest at an interval during the revolution of the wheel 19, and the other arm of each lever 39 is connected by a coiled wire retractile spring 42 with a bolt or stem 43 slidable through an outstanding lug 44 attached to the rim of the wheel 19. A nut 45 is threaded upon the bolt 43 and bears against the lug 44, and said nut can be rotated for adjusting the tension of the spring 42. When the heads 30 and buffers 41 are brought together, the levers 39 can swing, thereby bringing the springs 42 under greater tension, to allow the buffers to yield, thus absorbing the shocks which would occur otherwise.

Stops 45$^a$ are secured between the two annular sections of the rim 20 of the wheel 19, the arms 28 being movable between the sections of the rim between the stops 45$^a$ and buffers 41. The sections of the rim 20 have portions 45′ projecting inwardly adjacent the stops 45$^a$ and providing friction grips for frictionally receiving and gripping the arms 28 when they are swung adjacent the stops 45$^a$. The friction grips 45′ hold the arms 28 sufficiently tight to prevent the accidental disengagement of the arms 28 from the friction grips.

The inner arms or ends of the trip levers 32 are provided with shoes 46 coöperable with a trip which serves to operate the forks and ejectors. This trip embodies a resilient coil or coiled spring 47 embracing the shaft 18 adjacent the wheel 19, and a trip arm 48 projecting from said coil 47 into the path of the shoes 46. The coil 47 allows the trip arm 48 to yield. The normal position of the trip arm 48 is adjusted by means of a lever 49 attached to or integral with the coil 47, and having an arcuate upstanding rack 50 between the bars 17 adjacent the shaft 12. The rack 50 has a series of lugs 51 engageable over a cross piece 52 between the bars 17 adjacent the shaft 12. By springing the rack 50, the lever 49 can be swung vertically, to adjust the normal position of the trip arm 48, and by releasing the rack 50, the respective lug 51 is engaged over the cross piece 52 to hold the trip in place.

The device for arresting the manure thrown from the forks, and for directing the manure downwardly into the wagon or receptacle embodies an arm or bar 53 pivotally engaged at one end with the shaft 12 and projecting upwardly toward that side of the machine opposite the wheel 19. The bar 53 is held at various inclined positions, by means of a prop 54 pivoted at its upper end to the bar 53, and having its lower end engageable in one of a vertical series of apertures 55 with which the respective limb of the adjacent standard 5 is provided. The upper end of the bar 53 has a curved bracket 56, and a horizontal rock shaft 57 is journaled through the bracket 56. A series of depending fingers 58 are attached to the shaft 57 at one side of the bar 53 and extend to the opposite sides of the vertical plane in which the wheel 19 rotates. The shaft 57 has an arm 59 projecting from within the bracket 56, and an adjusting bar 60 is pivoted to the arm 59 and has a series of notches 61 engageable with a pin or lug 62 carried by the bar 53. By adjusting the bar 61, the rack composed of the fingers 58 can be adjusted at various angles relative to the bar 53, and said bar being adjustable vertically at various angles, enables the fingers 58 to be supported at the desired position, whereby they will properly arrest the manure discharged from the forks, and direct the manure downwardly into the wagon or receptacle.

In operation, supposing the bars 17, lever 49, and rack fingers 58 to be adjusted properly, the wheel 19 being rotated, will carry the forks around in an annular path. The wheel 19 overhangs the pile of manure, and the forks in their normal position are swung forwardly relative to the direction of rotation of the wheel 19, the arms 28 being held by the friction grips 45'. When one of the forks encounters the manure, it will by the frictional engagement of the respective arm 28 with the friction grip 45', be forced into the mass until the resistance offered overcomes the frictional resistance of the grip 45', whereupon the arm 28 is released from the grip, but owing to the pivotal connection 29 of the arm 28 with the wheel, the arm 28 is pulled upwardly with the wheel. The arm 28 swings inwardly toward the axis of the wheel against the respective buffer 41, and the fork lifts or tears a forkful of the material to the surface of the mass. The fork being released from the mass, will be swung outwardly by the buffer 41 from under the influence of the spring 42, and when the fork clears the pile or mass, it will be thrown outwardly by centrifugal force, thereby again engaging the arm 28 with the respective friction grip 45'. The arm 28 is wedged within the friction grip 45' due to the impetus of the outward movement of the arm 28. The arm 28 is now carried upward, and when it reaches or approaches its highermost position, the respective shoe 46 engages the trip arm 48, and then as the wheel turns, the trip arm 48 is moved ahead with the shoe 46 thereby bringing the trip arm under greater tension. This tension of the trip arm will swing the trip lever 32, by means of the link 33, whereby the ejector 37 is moved forward for ejecting the manure from the fork. The manure will therefore be thrown or pitched from the respective fork against and toward the fingers 58, which arrest the manure, and direct the same downwardly into the wagon or receptacle (not shown) disposed below said fingers. When the shoe 46 has passed the trip arm 48, the tension of the trip arm is relieved, and the parts will return to normal position, under the influence of the spring 38. It will be observed that the upward movement of the fork with the rotary wheel will give impetus or momentum to the manure when it is ejected from the forks, so that the manure will be thrown by centrifugal force from the wheel and against the fingers 58. The operation is continuous, each fork tearing a proportionate quantity of manure from the pile, and then tossing or pitching it to the fingers 58.

The wheel 19 can be raised and lowered by adjusting the bars 17 through the medium of the screw 25, and the carriage may be shifted longitudinally, in order that the forks may be properly applied to the piles of manure. The trip arm 48 may also be adjusted by adjusting the rack 50, so that the manure will be properly discharged from the forks against the fingers 58, and said fingers may be adjusted at various heights and angles, for properly delivering the manure into the wagon or receptacle.

The present machine is not only useful for loading manure into wagons or other receptacles, but can be used to advantage for other purposes as well.

Having thus described the invention, what is claimed as new is:

1. In a loader, a rotary wheel, a movable bucket carried thereby and movable in the direction of rotation of the wheel, means for holding the bucket when it is moved in the direction of rotation of the wheel, the bucket being moved in said direction by centrifugal action, and means movable with the bucket and operable for discharging the contents thereof at one point of its path of rotation.

2. In a loader, a rotary member, a bucket pivotally connected therewith to swing by centrifugal action in the direction of rotation of the member, means for holding the said bucket when swung in said direction, and means movable with the bucket and operable for discharging the contents thereof at one point of its path of rotation.

3. In a loader, a rotary member, an arm pivoted to said member and having a bucket at its free end, means for holding said arm when it is swung away from the center of said member, and means movable with the bucket and operable for discharging the contents thereof at one point of its path of rotation.

4. In a loader, a rotary member, an arm pivoted to said member and having a bucket at its free end, means for holding said arm when it is swung away from the center of said member, an ejector coöperable with the bucket, and trip means for operating said ejector when the bucket is brought to an upper position.

5. In a loader, a rotary wheel having spokes and a rim, an arm pivoted to one spoke and projecting past the rim, said arm having a bucket at its free end, a buffer carried by the rim, said rim having a friction grip for engaging said arm, said arm being swingable between said grip and buffer, an ejector carried by said arm and coöperable with the bucket to eject the contents thereof, a lever carried by the wheel and operatively connected with said ejector, and a trip member disposed in the path of said lever for swinging it to operate the ejector.

6. In a loader, a rotary wheel having spokes and a rim, an arm pivoted to one spoke and projecting in a chordal direction beyond the rim, said arm having a bucket at its free end, a lever pivoted to said arm and having an ejector coöperable with the bucket, a spring pressed lever having the same pivot as said arm, a link connecting the two levers, a trip disposed in the path of the second mentioned lever for actuating it, and means for holding said arm when it is swung outwardly.

7. In a loader, a shaft, a wheel carried thereby, a bucket carried by said wheel, an ejector coöperable with said bucket, a trip lever pivoted to the wheel and operatively connected with the ejector, an adjustable trip having a coil upon said shaft, and a trip arm projecting from the coil in the path of said lever.

8. In a loader, a movable frame, a shaft carried by said frame, a wheel carried by the shaft, an arm pivoted to the wheel and projecting in a chordal direction beyond the rim thereof, a buffer carried by the rim, said rim having a friction grip for engaging said arm, said arm being swingable between said grip and buffer, a bucket carried by the free end of said arm, a lever pivoted to said arm and having an ejector coöperable with the bucket, a trip lever pivoted to the wheel at the pivot of said arm and having its outer arm linked to the aforesaid lever, a spring connecting the second mentioned lever and arm, and a trip having a coil upon the shaft adjacent the wheel and the trip arm projecting from said coil in the path of the trip lever, the trip and frame having coöperable means for holding the trip at various positions.

In testimony that I claim the foregoing as my own, I have hereto affixed my signature in the presence of two witnesses.

ALBERT HOSSFELD.

Witnesses:
R. L. THOMPSON,
A. E. LAUFENBERG.